Dec. 8, 1953　　　O. W. STROHM　　　2,661,819
MOTOR VEHICLE BRAKING APPARATUS
Filed June 1, 1951
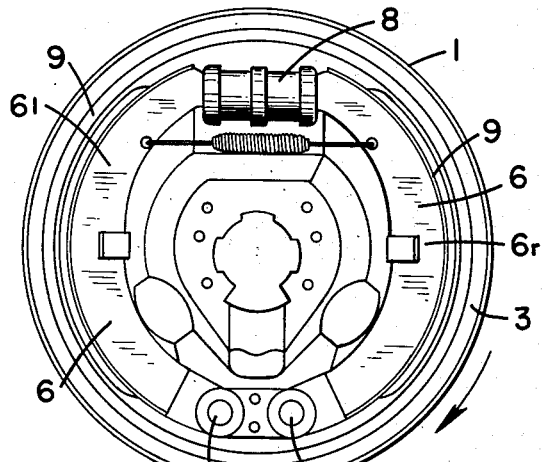
FIG. 1
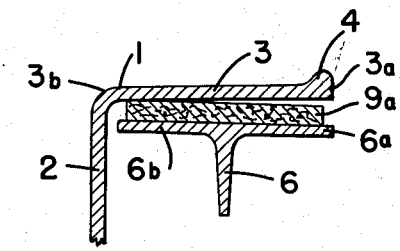
FIG. 2
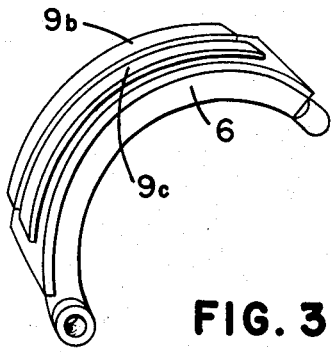
FIG. 3
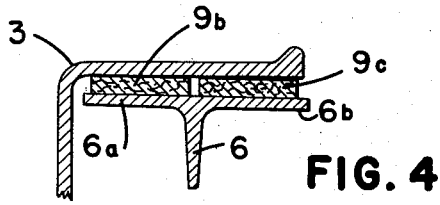
FIG. 4
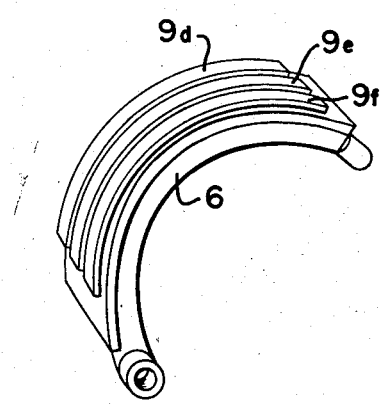
FIG. 5
FIG. 6
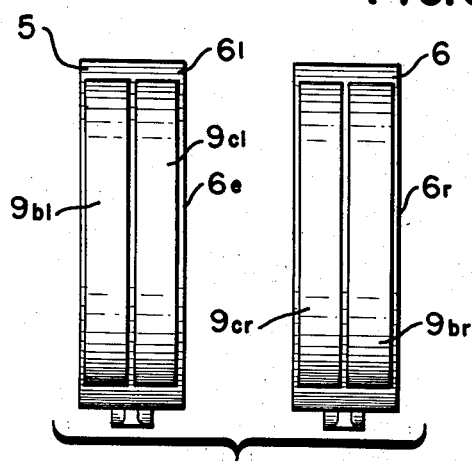
FIG. 7
INVENTOR.
OSCAR W. STROHM
BY
Christy, Parmelee & Strickland
his attorneys Patented Dec. 8, 1953

2,661,819

UNITED STATES PATENT OFFICE 2,661,819

MOTOR VEHICLE BRAKING APPARATUS

Oscar W. Strohm, Sharpsburg, Pa., assignor to Multi-Ring Brake Drum Corporation, Allison Park, Pa., a corporation of Pennsylvania Application June 1, 1951, Serial No. 229,396

2 Claims. (Cl. 188—78)

This invention relates, as indicated, to braking apparatus for motor vehicles and, more particularly, to improvements in such apparatus which will prevent damage to the brake drum and thereby increase its life and which will increase the braking action of any given apparatus.

This invention is primarily concerned with heavy duty braking apparatus of the type commonly employed on large motor trucks and trailers. In such apparatus, the braking action is effected by the internal expanding engagement of a brake shoe or block against the inner surface of a cylindrical drum. The cylindrical drum is supported by a disc at only one axial end thereof, its other axial end being unsupported. Due to the fact that the drum is unsupported at one end thereof, the force of the brake block thereagainst causes its unsupported end to expand more than its inner or supported end. The drum thus acts much in the nature of a cantilever beam and its outer edge in the expansion of the drum moves out of engagement with the brake shoe so that in time only a small portion of the drum at the inner end thereof is effective as a braking surface. This action of the drum in expanding is commonly referred to in the art as "belling." This belling action not only results in damage to the drum with a consequent shortening of its life, but also reduces the effective braking force.

One of the principal objects of this invention is to provide improved braking apparatus which will counteract the reduction in braking force due to belling of the brake drum, and which reduces the factors causing belling.

A further object of the invention is to provide improvements in brake shoes for braking apparatus which will reduce belling of a drum and the reduction in braking force incident thereto.

Another object of the invention is to provide an improved form of brake shoe in which the braking material has a coefficient of friction which varies from edge-to-edge of the shoe in an axial direction.

A still further object of the invention is to provide an improved brake shoe in which the coefficient of friction increases in a direction from the inner axial end to the outer axial end of the shoe.

A still further object of the invention is to provide an improved brake shoe in which the braking surface is formed of a plurality of segmental strips spaced from each other in an axial direction of the shoe, and in which the strip engageable with the inner end of a cooperating brake drum has a lower coefficient of friction than the strip engageable with the outer or free end of the drum.

Other objects and advantages of the invention will be apparent from the following description.

In the drawings, there is shown a preferred embodiment of the invention. In this showing:

Fig. 1 is an end elevational view of a drum and its cooperating brake shoe;

Fig. 2 is a fragmentary sectional view illustrating the belling action which takes place in the normal operation of a conventional brake apparatus;

Fig. 3 is a perspective view of one of the shoes shown in Fig. 1;

Fig. 4 is a transverse sectional view taken centrally of the shoe shown in Fig. 3;

Fig. 5 is a view similar to Fig. 3 illustrating a modified construction;

Fig. 6 is a transverse sectional view taken centrally of the shoe shown in Fig. 5; and Fig. 7 is an elevational view of the two shoes shown in Fig. 1 looking in a direction toward the braking surface thereon.

The principles of this invention are applicable for use with any metal brake drum of conventional construction and may be used with either pressed or cast drums. In the drawings, there is shown one conventional form of drum. In this showing, the drum is designated by the numeral 1 and comprises an end mounting plate 2 having a circumferential brake drum 3 which is cylindrical in shape. The parts 2 and 3 may be formed integrally, as illustrated, or may be formed separately and secured together in accordance with conventional practice. The outer or free end of the cylindrical drum 2 is provided with a reinforcing flange 4.

Fig. 1 illustrates a conventional arrangement of brake shoes and operating mechanism therefor for use with the drum 1. The shoes 6 are of T-section, and have mounting pivots 7 and a hydraulic actuator 8 by which they may be expanded integrally into engagement with the cylindrical drum 3. The shoes 6 each have frictional brake linings or blocks 9 mounted thereon for engagement with the inner surface of the drum. The linings 9 are formed of molded material and are secured to the shoes 6 by rivets (not shown) or by any other suitable mounting connection such as bonding. The apparatus thus far described is conventional and forms no part per se of this invention.

Fig. 2 illustrates the manner in which belling of the drum takes place in conventional braking apparatus. In this showing, the shoe 6 is illustrated as having a single brake block 9a mounted thereon. In conventional constructions of this character, the brake block 9a has a uniform coefficient of friction in an axial direction from its inner edge to its outer edge. When the shoe 6 is operated to force the block 9a into engagement with the drum 3, the drum 3, being connected at its inner end to the mounting disc 2, acts much in the nature of a cantilever beam with its outer end 3a expanding more than its inner end 3b. This belling action results in the outer edge 3a of the drum moving away from the outer edge 6a of the shoe as illustrated in Fig. 6. The axial taper of the drum 3 illustrated in Fig. 2, and the divergence of its inner braking surface with respect to the outer braking surface of the block 9a is exaggerated for the purposes of illustration. The belling action which takes place when the drums and shoes are both new and perfectly aligned is hardly noticeable, but increases with wear, and results in a loss or reduction in pressure at the outer edge 3a of the drum with a consequent reduction in braking force. Even though the belling action is insufficient to disengage the outer edge of the drum from the brake, it results in a reduction of pressure of the shoe against the outer edge of the drum with a corresponding reduction in braking effort. The braking action by reason of belling of the drum in conventional apparatus progressively diminishes in an axial direction from its inner supported end to its outer unsupported end. The effects of belling are noticeable in conventional brakes from a visual inspection which shows that the inner lining edge 6b of the shoe wears faster than at the outer edge 6a.

In accordance with the principles of this invention, compensation for the belling action of the drum as described is effected by providing the shoe with a frictional lining in which the coefficient of friction varies in an axial direction. As illustrated in Figs. 3 and 4, the shoe 6 is provided with two segmental strips 9b and 9c which are respectively formed of materials having different coefficients of friction. The strip 9b at the inner edge 6a of the shoe is formed of a harder material having a lower coefficient of friction than the material from which the strip 9c is formed. The strip 9c is mounted on the outer edge 6b of the shoe and is formed of a relatively softer material having a higher coefficient of friction. Due to the strip 9c having a higher coefficient of friction, the braking action will not be increased due to a belling action of the drum as will be the case with a single brake block having uniform coefficient of friction as at 9a in Fig. 2. Consequently, the operator will not have to increase the pressure on the shoe to compensate for loss of braking effort due to belling action and the total amount of belling action will be consequently decreased. The inner brake strip 9b being of a harder material will wear longer and thus eliminate the tapering wear which takes place in conventional linings such as 9a.

If desired, three strips such as the strips 9d, 9e and 9f as shown in Figs. 5 and 6 may be employed in place of two as shown in Figs. 3 and 4. In such case, the strip 9d would be formed of a material relatively harder and having a lower coefficient of friction than the material forming the strip 9e. Similarly, the strip 9e would be formed of a material relatively harder and having a lower coefficient of friction than the material forming the strip 9f.

In the preferred practice of the invention, the lining 9 will be formed of a single continuous strip in which the hardness of the material and its coefficient of friction progressively varies from one edge 6a to the other edge 6b of the brake shoe on which it is mounted. In other words, the single strip of lining would be formed of a material having a hardness which decreases progressively from the inner edge 6a to the outer edge 6b, and a coefficient of friction which would increase inversely with the hardness of the material. The illustrated embodiments of the invention take advantage of the different commercially available brake lining materials which may be purchased at present on the open market. The brake linings which may be purchased today are of three kinds generally designated by all manufacturers as hard, medium, and soft linings. The harder ones of these linings of course wear longer than the softer, and have lower coefficients of friction. In the case of the modification shown in Figs. 5 and 6, all three of the commercially available linings may be employed for the strips 9d and 9e and 9f. In the case of the modifications shown in Figs. 3 and 4, any combination of these three materials may be used. However, it will be understood that in all cases the lining adjacent the inner edge 6a of the shoe and adjacent the supported edge of the drum will be the harder lining.

With a drum rotating as indicated by the arrow in Fig. 1, the drum is passing over the shoe 6l in a direction away from its pivot 7, and the frictional engagement of the left shoe 6l with the drum will tend to move the shoe 6l into tighter engagement with the drum. On the other hand, the drum is moving over the shoe 6r in a direction toward its pivot 7 and the frictional engagement of the right shoe 6r with the drum will tend to move the shoe 6r about its pivot 7 in a direction tending to disengage the shoe from the drum. This action in practice results in the lining on the shoe 6l wearing slightly faster than the lining on the shoe 6r. The principles of this invention are adaptable to an arrangement of linings compensating for this difference in wear. In Fig. 7, the two shoes 6l and 6r are shown with the strips of lining thereon designated as 9bl—9cl and 9br—9cr. In this arrangement, for example, the strip 9bl may be formed of the hard lining, while 9cl is formed of the medium lining. In such case, the lining 9cl will have the highest coefficient of friction as described in connection with the strip 9c of Fig. 4. This same arrangement will be had by forming the strip 9br of medium lining and the strip 9cr of soft lining. In this case, the strip 9cr will have the highest coefficient of friction corresponding to the coefficient described for the strip 9c of Fig. 5. However, the shoe 6l is formed of materials having a higher average degree of hardness than the materials used on the shoe 6r. This difference in the average degree of hardness will compensate for wear due to the rotating action tending to engage the shoe 6l and disengage the shoe 6r as described above in connection with Fig. 1. This compensation will increase the total braking force, and at the same time tend to reduce the tendency of the shoe 6r to wear faster than the shoe 6l.

From the foregoing it will be apparent that the brake shoe of this invention is provided with a lining having a coefficient of friction which varies from edge to edge in an axial direction. The lining is formed of axially spaced portions having different coefficients of friction, and the portion at the inner edge which engages with the inner or supported end of the drum has a coefficient of friction which is lower than the portion at its outer edge which engages with the outer or unsupported end of the drum. In this manner, the coefficient of friction of the shoe compensates for decreasing brake pressure in a direction axially of the drum so that a uniform braking action is obtained over the entire axial length of the drum. This results in a more uniform lining wear and a longer life for both the drum and the lining.

While I have illustrated and described certain specific embodiments of my invention, it will be understood that this is merely by way of illustration, and that various changes and modifications may be made within the contemplation of my invention and under the scope of the following claims.

I claim:

1. In braking apparatus, the combination comprising a cylindrical drum supported only at one axial end thereof and unsupported at its other axial end, said drum having an internal cylindrical braking surface, shoe means including a frictional lining thereon for engagement with said drum surface and formed of axially spaced portions respectively having different coefficients of friction, the portion engageable with the supported end of said drum surface having a lower coefficient of friction than the portion engageable with the unsuppported end thereof, the coefficient of friction of said lining portions being effective to compensate for belling of the drum due to pressure of the lining thereagainst so as to obtain a uniform braking effect over the axial length of the drums engaged by said lining, and means for moving said shoe means to engage and disengage its lining with said drum surface.

2. For use with a conventional brake drum having an internal cylindrical braking surface supported at only one axial end thereof, shoe means including a friction lining comprising axially spaced lining portions of arcuate shape, said portions having different coefficients of friction with the portion having the highest coefficient of friction at one edge of the shoe means and the portion having the lowest coefficient of friction at the other edge of the shoe means, the portion having the lowest coefficient of friction being arranged for engagement with the internal braking drum surface adjacent its inner supported end thereof, the varying coefficients of friction of said portions being effective to compensate for belling of the drum to obtain a uniform braking effort over the entire axial length of the drum.

OSCAR W. STROHM.

References Cited in the file of this patent
UNITED STATES PATENTS

| Number | Name | Date |
|---|---|---|
| 1,320,669 | Auger | Nov. 4, 1919 |
| 1,557,670 | De France | Oct. 20, 1925 |
| 1,919,542 | Dick | July 25, 1933 |
| 2,028,621 | Norton | Jan. 21, 1936 |
| 2,161,363 | Malcolm | June 6, 1939 |
| 2,355,419 | Bruce | Aug. 8, 1944 |